(12) United States Patent
Shabbir et al.

(10) Patent No.: US 9,965,020 B2
(45) Date of Patent: May 8, 2018

(54) SYSTEMS AND METHODS FOR POWER SUPPLY DERATING

(71) Applicant: Dell Products L.P., Round Rock, TX (US)

(72) Inventors: Hasnain Shabbir, Round Rock, TX (US); Dinesh Kunnathur Ragupathi, Round Rock, TX (US); Ashish Manjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 179 days.

(21) Appl. No.: 14/657,137

(22) Filed: Mar. 13, 2015

(65) Prior Publication Data

US 2016/0266635 A1 Sep. 15, 2016

(51) Int. Cl.
*G06F 1/32* (2006.01)
*G06F 1/20* (2006.01)
*G06F 1/26* (2006.01)

(52) U.S. Cl.
CPC ........... *G06F 1/3243* (2013.01); *G06F 1/206* (2013.01); *G06F 1/26* (2013.01); *G06F 1/3206* (2013.01); *G06F 1/3296* (2013.01); *Y02B 60/1239* (2013.01); *Y02B 60/1275* (2013.01); *Y02B 60/1285* (2013.01)

(58) Field of Classification Search
CPC ............................... G06F 1/325; G06F 1/3206
See application file for complete search history.

(56) References Cited

U.S. PATENT DOCUMENTS

| 5,815,389 | A | * | 9/1998 | Plow | G06F 1/26 320/134 |
| 6,348,777 | B1 | * | 2/2002 | Brown | H02J 7/0091 320/137 |
| 8,595,535 | B1 | * | 11/2013 | Tamilarasan | G06F 11/3034 700/297 |
| 2002/0147932 | A1 | * | 10/2002 | Brock | G06F 1/3203 713/300 |
| 2004/0088593 | A1 | * | 5/2004 | Park | G06F 1/206 713/322 |

(Continued)

*Primary Examiner* — Robert Cassity
*Assistant Examiner* — Gary Collins
(74) *Attorney, Agent, or Firm* — Jackson Walker L.L.P.

(57) ABSTRACT

An information handling system may include at least one information handling resource, a power supply unit for supplying electrical energy to at least one information handling resource, and a controller. The power supply unit may include an ambient temperature sensor for sensing an ambient temperature ambient to the power supply unit and a component temperature sensor for sensing a component temperature of a component integral to the power supply unit. The controller may be communicatively coupled to the power supply unit and configured to receive signals from the power supply unit indicative of the ambient and component temperatures, determine an ambient sensor-based power rating for the power supply based on the ambient temperature, determine a component sensor-based power rating for the power supply based on the component temperature, and select a maximum of the ambient sensor-based power rating and the component sensor-based power rating as a selected power rating.

17 Claims, 2 Drawing Sheets

(56) References Cited

U.S. PATENT DOCUMENTS

| | | | | |
|---|---|---|---|---|
| 2005/0174737 A1* | 8/2005 | Meir | ............... | G06F 1/206 |
| | | | | 361/697 |
| 2005/0190517 A1* | 9/2005 | Schweigert | ............ | H02M 1/32 |
| | | | | 361/93.1 |
| 2005/0210905 A1* | 9/2005 | Burns | ............... | G06F 1/206 |
| | | | | 62/259.2 |
| 2006/0288241 A1* | 12/2006 | Felter | ............... | G06F 1/3203 |
| | | | | 713/300 |
| 2009/0172453 A1* | 7/2009 | Dishman | ............... | G06F 1/263 |
| | | | | 713/340 |
| 2009/0207566 A1* | 8/2009 | Appel | ............... | H02M 1/32 |
| | | | | 361/692 |
| 2009/0299543 A1* | 12/2009 | Cox | ............... | G06F 1/203 |
| | | | | 700/299 |
| 2011/0078479 A1* | 3/2011 | Vogman | ............... | G06F 1/206 |
| | | | | 713/340 |
| 2011/0301777 A1* | 12/2011 | Cox | ............... | G06F 1/206 |
| | | | | 700/299 |
| 2012/0218707 A1* | 8/2012 | Chan | ............... | H05K 7/20518 |
| | | | | 361/679.48 |
| 2013/0100568 A1* | 4/2013 | Mistry | ............... | H02H 3/006 |
| | | | | 361/103 |
| 2013/0154599 A1* | 6/2013 | Pan | ............... | G06F 1/3206 |
| | | | | 323/304 |
| 2014/0181562 A1* | 6/2014 | Das | ............... | G06F 1/206 |
| | | | | 713/324 |
| 2015/0370294 A1* | 12/2015 | Busch | ............... | G06F 1/206 |
| | | | | 713/322 |

* cited by examiner

SYSTEMS AND METHODS FOR POWER SUPPLY DERATING

TECHNICAL FIELD

The present disclosure relates in general to information handling systems, and more particularly to systems and methods for optimized derating of power supply units.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. In many existing approaches, a power supply unit may have associated therewith an ambient temperature sensor that detects an ambient air temperature associated with the power supply unit, for example at an inlet of airflow to the power supply unit. Many such power supply units also have associated therewith a control system configured to control the power output of a power supply unit based on the ambient air temperature, so as to reduce the likelihood of overheating of the power supply which may cause damage thereto. Thus, in response to increasing temperatures the power supply may be derated—the power output of the power supply may be reduced as a result of the temperature increase.

Derating of a power supply based on ambient temperature may have disadvantages, as ambient temperature may not be a reliable indicator of the health of a power supply unit. For example, power supply ambient inlet temperature sensors may be subject to inaccuracy based on the location of the sensor within the power supply unit as well as local heating effects and local hotspots of inlet air from within an information handling system (e.g., such as when a power supply inlet is near heatsink exhaust of a processor). Accordingly, a power supply may become derated based upon an ambient temperature sensor reading which unreliably represents the health of the power supply unit, leading to unnecessary loss of power availability.

SUMMARY

In accordance with the teachings of the present disclosure, the disadvantages and problems associated with existing approaches to power supply unit derating may be reduced or eliminated.

In accordance with embodiments of the present disclosure, an information handling system may include at least one information handling resource, a power supply unit for supplying electrical energy to at least one information handling resource, and a controller communicatively coupled to the power supply unit. The power supply unit may include an ambient temperature sensor for sensing an ambient temperature ambient to the power supply unit and a component temperature sensor for sensing a component temperature of a component integral to the power supply unit. The controller may be communicatively coupled to the power supply unit and configured to receive signals from the power supply unit indicative of the ambient temperature and the component temperature, determine an ambient sensor-based power rating for the power supply based on the ambient temperature, determine a component sensor-based power rating for the power supply based on the component temperature, and select a maximum of the ambient sensor-based power rating and the component sensor-based power rating as a selected power rating.

In accordance with these and other embodiments of the present disclosure, a method may include determining an ambient sensor-based power rating for a power supply based on an ambient temperature sensed ambient to a power supply unit. The method may also include determining a component sensor-based power rating for the power supply based on a component temperature of a component integral to the power supply unit. The method may also include selecting a maximum of the ambient sensor-based power rating and the component sensor-based power rating as a selected power rating for the power supply unit.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to: determine an ambient sensor-based power rating for a power supply based on an ambient temperature sensed ambient to a power supply unit, determine a component sensor-based power rating for the power supply based on a component temperature of a component integral to the power supply unit, and select a maximum of the ambient sensor-based power rating and the component sensor-based power rating as a selected power rating for the power supply unit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
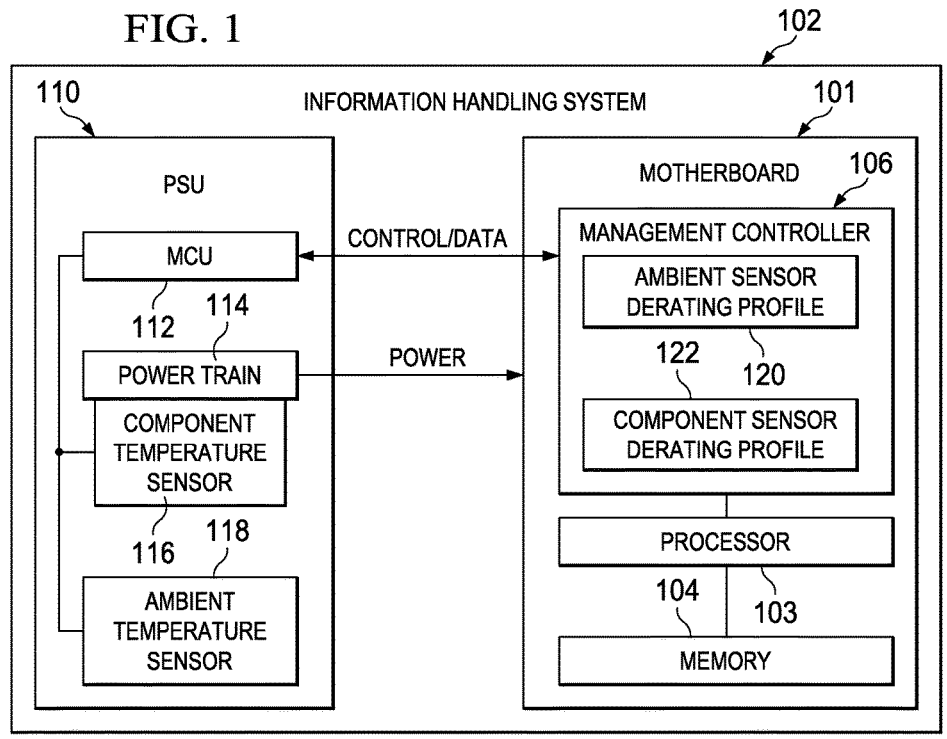
FIG. 1 illustrates a block diagram of an example information handling system, in accordance with embodiments of the present disclosure.

FIG. 1 illustrates a block diagram of an example of an information handling system 102. As depicted, information handling system 102 may include PSU 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is turned off.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller of Integrated Dell Remote Access Controller). In other embodiments, management controller 106 may include or may be an integral part of a chassis management controller (CMC). In some embodiments, management controller 106 may be configured to communicate with PSU 110 to communicate control and/or telemetry data between the two.

Generally speaking, PSU 110 may include any system, device, or apparatus configured to supply electrical current to one or more information handling resources of information handling system 102. As shown in FIG. 1, PSU 110 may include a microcontroller unit (MCU) 112, a power train 114, a component temperature sensor 116, and an ambient temperature sensor 118.

MCU 112 may comprise a microprocessor, DSP, ASIC, FPGA, EEPROM, or any combination thereof, or any other device, system, or apparatus for controlling operation of its associated PSU 110. As such, MCU 112 may comprise firmware, logic, and/or data for controlling functionality of such PSU 110.

Power train 114 may include any suitable system, device, or apparatus for converting electrical energy received by power supply unit 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator).

Component temperature sensor 116 may be communicatively coupled to MCU 112 and may include any system, device, or apparatus (e.g., a thermometer, thermistor, etc.) configured to communicate a signal to MCU 112 indicative of a temperature at or near a component of power train 114 (e.g., a converter, heatsink, transistor, or other component of power train 114).

Ambient temperature sensor 118 may be communicatively coupled to MCU 112 and may include any system, device, or apparatus (e.g., a thermometer, thermistor, etc.) configured to communicate a signal to MCU 112 indicative of a temperature ambient to PSU 110 (e.g., an inlet air temperature for airflow into or by PSU 110).

In addition to motherboard 101, processor 103, memory 104, management controller 106, and PSU 110, information handling system 102 may include one or more other information handling resources. For example, for ease of exposition, information handling system 102 is shown having a single PSU 110. However, in other embodiments, information handling system 102 may have a plurality of PSUs 110.

Figure 2:
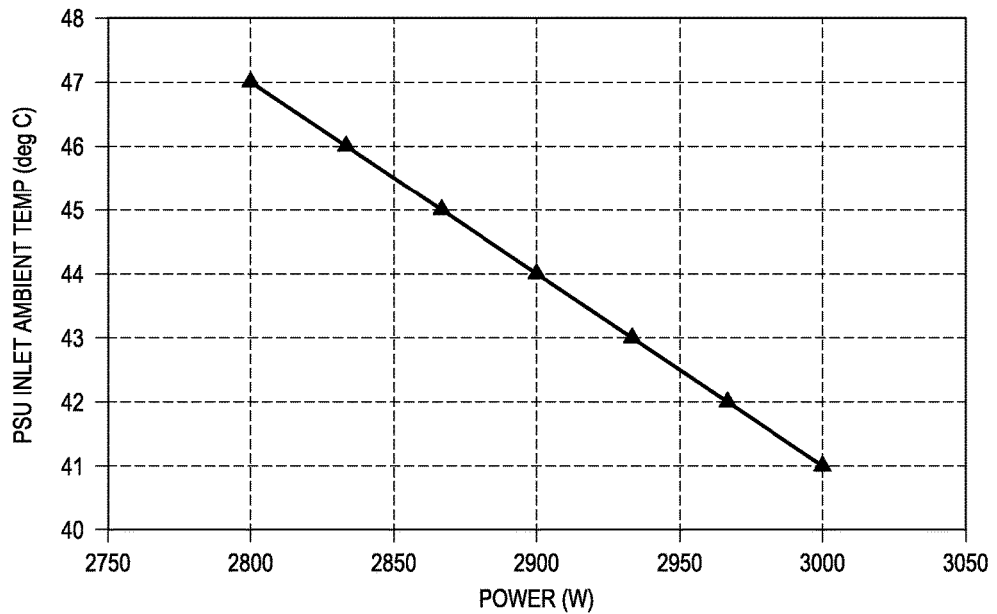
FIG. 2 is a graph illustrating an example ambient sensor derating profile, in accordance with embodiments of the present disclosure.

Turning again to management controller 106, management controller 106 may have stored thereon or in computer-readable media accessible thereto an ambient sensor derating profile 120 and a component sensor derating profile 122. Ambient sensor derating profile 120 may define for a range of temperatures of ambient temperature sensor 118 a corresponding maximum amount of power (e.g., a power rating) to be output by PSU 110 in order to prevent overheating of PSU 110, assuming that separate component temperature sensor 116 is not present. In some embodiments, ambient sensor derating profile 120 may represent a profile for a fresh air derating range of PSU 110. In these and other embodiments, ambient sensor derating profile 120 may comprise a curve which dynamically associates a given ambient temperature with a given output power rating. An example ambient sensor derating profile 120 for a hypothetical PSU 110 is shown in FIG. 2. As shown in FIG. 2, an ambient sensor-based power rating for PSU 110 may decrease from a maximum power rating of 3000 watts to a minimum power rating of 2800 watts over a range of 42° C. to 47° C.

Component sensor derating profile 122 may define for a range of temperatures of component temperature sensor 116 a corresponding maximum amount of power (e.g., a power rating) to be output by PSU 110 in order to prevent overheating of PSU 110, assuming that separate ambient temperature sensor 118 is not present. In some embodiments, component sensor derating profile 122 may comprise a curve which dynamically associates a given component temperature with a given output power rating. In these and other embodiments, an endpoint temperature of component sensor derating profile 122 may be approximately equal to or otherwise based on a maximum safe operating temperature for PSU 110 (e.g., as determined by a manufacturer or other vendor of PSU 110). In such embodiments, such maximum safe operating temperature may be extracted from PSU 110 by management controller 106. Further, in such embodiments, component sensor derating profile 122 may be determined dynamically by management controller 106 based on such maximum safe operating temperature, readings of component temperature sensor 116, and/or other thermal parameters of PSU 110. In some embodiments, ambient sensor derating profile 120 may be determined in a similar manner.

Figure 3:
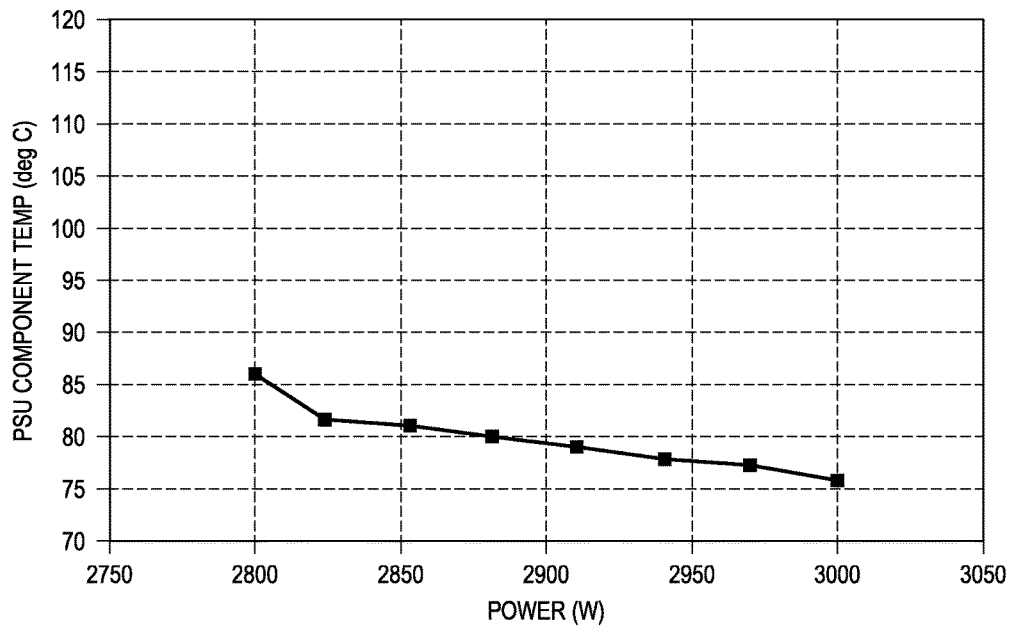
FIG. 3 is a graph illustrating an example component sensor derating profile, in accordance with embodiments of the present disclosure.

An example component sensor derating profile 122 for a hypothetical PSU 110 is shown in FIG. 3. As shown in FIG. 3, a component sensor-based power rating for PSU 110 may decrease from a maximum power rating of 3000 watts to a minimum power rating of 2800 watts over a range of 76° C. to 86° C. In the example given in FIG. 3, the endpoint temperature of 86° C. may be a maximum safe operating temperature for PSU 110 or a temperature which may be based on such a maximum safe operating temperature (e.g., a temperature which is 5° C. or 10% below such maximum safe operating temperature).

Figure 4:
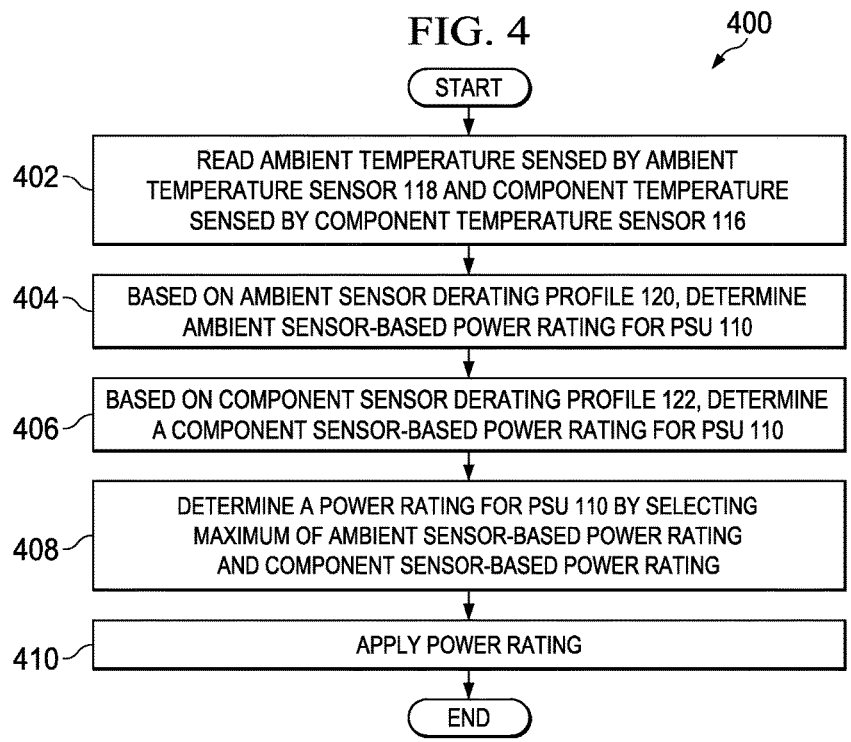
FIG. 4 illustrates a flow chart of an example method for power supply unit derating, in accordance with embodiments of the present disclosure.

FIG. 4 illustrates a flow chart of an example method 400 for derating of PSU 110, in accordance with embodiments of the present disclosure. According to certain embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, management controller 106 may read from PSU 110 an ambient temperature sensed by ambient temperature sensor 118 and a component temperature sensed by component temperature sensor 116. At step 404, management controller 106 may, based on ambient sensor derating profile 120, determine an ambient sensor-based power rating for PSU 110. At step 406, management controller 112 may, based on component sensor derating profile 122, determine a component sensor-based power rating for PSU 110.

At step 408, management controller 106 may determine a power rating for PSU 110 by selecting the maximum of the ambient sensor-based power rating and the component sensor-based power rating as the power rating. At step 410, management controller 106 may apply the power rating by communicating one or more control signals to MCU 112 of PSU 110. In response, PSU 110 may operate to generate a maximum amount of power in accordance with the power rating applied at step 410. After completion of step 410, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102, components thereof or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   at least one information handling resource;
   a power supply unit for supplying electrical energy to the at least one information handling resource, the power supply unit including:
      an ambient temperature sensor for sensing an ambient temperature ambient to the power supply unit; and
      a component temperature sensor for sensing a component temperature of a component integral to the power supply unit; and
   a controller communicatively coupled to the power supply unit and configured to:
      receive signals from the power supply unit indicative of the ambient temperature and the component temperature;
      determine an ambient sensor-based power rating for the power supply based on the ambient temperature;
      determine a component sensor-based power rating for the power supply based on the component temperature;
      select a maximum of the ambient sensor-based power rating and the component sensor-based power rating as a selected power rating; and
      apply the selected power rating to the power supply unit such that the power supply unit is configured to generate an amount of power not exceeding that defined by the selected power rating.

2. The information handling system of claim 1, wherein:
   determining the ambient sensor-based power rating comprises reading an ambient sensor derating profile for the power supply unit defining for each of a range of temperatures the ambient temperature sensor respective values for ambient sensor-based power rating; and
   determining the component sensor-based power rating comprises reading a component sensor derating profile for the power supply unit defining for each of a range of temperatures the component temperature sensor respective values for component sensor-based power rating.

3. The information handling system of claim 2, wherein an endpoint temperature for the component sensor derating profile is based on a maximum safe operating temperature of the power supply unit.

4. The information handling system of claim 2, wherein the component sensor derating profile is determined based at least on a maximum safe operating temperature of the power supply unit.

5. The information handling system of claim 1, wherein the power supply unit comprises a power train, and the component temperature sensor is configured to sense temperature of a component of the power train.

6. A method comprising:
   determining an ambient sensor-based power rating for a power supply based on an ambient temperature sensed ambient to a power supply unit;
   determining a component sensor-based power rating for the power supply based on a component temperature of a component integral to the power supply unit;
   selecting a maximum of the ambient sensor-based power rating and the component sensor-based power rating as a selected power rating for the power supply unit; and
   applying the selected power rating to the power supply unit such that the power supply unit generates an amount of power not exceeding that defined by the selected power rating.

7. The method of claim 6, further comprising receiving signals from the power supply unit indicative of the ambient temperature and the component temperature.

8. The method of claim 6, wherein:
   determining the ambient sensor-based power rating comprises reading an ambient sensor derating profile for the power supply unit defining for each of a range of temperatures the ambient temperature sensor respective values for ambient sensor-based power rating; and
   determining the component sensor-based power rating comprises reading a component sensor derating profile for the power supply unit defining for each of a range of temperatures the component temperature sensor respective values for component sensor-based power rating.

9. The method of claim 8, wherein an endpoint temperature for the component sensor derating profile is based on a maximum safe operating temperature of the power supply unit.

10. The method of claim 8, further comprising determining the component sensor derating profile based at least on a maximum safe operating temperature of the power supply unit.

11. The method of claim 6, wherein the power supply unit comprises a power train, and the component temperature sensor senses temperature of a component of the power train.

12. An article of manufacture comprising:
    a non-transitory computer-readable medium; and
    computer-executable instructions carried on the computer-readable medium, the instructions readable by a processor, the instructions, when read and executed, for causing the processor to:
       determine an ambient sensor-based power rating for a power supply based on an ambient temperature sensed ambient to a power supply unit;
       determine a component sensor-based power rating for the power supply based on a component temperature of a component integral to the power supply unit;
       select a maximum of the ambient sensor-based power rating and the component sensor-based power rating as a selected power rating for the power supply unit; and
       apply the selected power rating to the power supply unit such that the power supply unit generates an amount of power not exceeding that defined by the selected power rating.

13. The article of claim 12, the instructions for further causing the processor to receive signals from the power supply unit indicative of the ambient temperature and the component temperature.

14. The article of claim 12, wherein:
  determining the ambient sensor-based power rating comprises reading an ambient sensor derating profile for the power supply unit defining for each of a range of temperatures the ambient temperature sensor respective values for ambient sensor-based power rating; and
  determining the component sensor-based power rating comprises reading a component sensor derating profile for the power supply unit defining for each of a range of temperatures the component temperature sensor respective values for component sensor-based power rating.

15. The article of claim 14, wherein an endpoint temperature for the component sensor derating profile is based on a maximum safe operating temperature of the power supply unit.

16. The article of claim 14, the instructions for further causing the component sensor derating profile to be determined based at least on a maximum safe operating temperature of the power supply unit.

17. The article of claim 14, wherein the power supply unit comprises a power train, and the component temperature sensor is configured to sense temperature of a component of the power train.

\* \* \* \* \*